United States Patent [19]
Leuschner et al.

[11] 3,711,681
[45] Jan. 16, 1973

[54] ELECTRIC THRU-FLOW HEATER FOR USE WITH COFFEE MACHINES AND THE LIKE

[75] Inventors: Udo Leuschner; Wolf-Dieter Schubert, both of Traunreut, Germany

[73] Assignee: Siemens-Electrogerate GmbH, Berlin and Munchen, Germany

[22] Filed: May 11, 1971

[21] Appl. No.: 142,287

[30] Foreign Application Priority Data

May 14, 1970 Germany..................P 20 23 598.7

[52] U.S. Cl. .....................219/303, 99/281, 99/288, 165/168, 219/283, 219/328, 219/336, 222/146 HE
[51] Int. Cl..........H05b 1/02, A47j 31/00, F24h 1/14
[58] Field of Search..............219/296–299, 302–305, 219/308, 309, 311, 328, 335–338, 280–283; 165/167, 168, 171; 126/5, 54; 99/282, 281, 283, 306–314, 288; 222/146 HE, 146 H

[56] References Cited

UNITED STATES PATENTS

| | | | |
|---|---|---|---|
| 2,875,312 | 2/1959 | Norton | 219/302 UX |
| 3,319,561 | 5/1967 | Bloomfield | 219/304 X |
| 2,579,898 | 12/1951 | Brucker | 219/345 UX |
| 1,257,106 | 2/1918 | Parkhurst | 219/457 |
| 3,513,767 | 5/1970 | Bloomfield et al. | 219/283 UX |
| 2,987,300 | 6/1961 | Greene | 219/302 UX |

FOREIGN PATENTS OR APPLICATIONS

| | | | |
|---|---|---|---|
| 531,681 | 8/1955 | Italy | 165/171 |
| 236,963 | 9/1945 | Switzerland | 219/283 |
| 802,271 | 10/1958 | Great Britain | 165/171 |
| 341,392 | 10/1921 | Germany | 219/302 |
| 423,121 | 7/1947 | Italy | 219/297 |

Primary Examiner—A. Bartis
Attorney—Curt M. Avery, Arthur E. Wilfond, Herbert L. Lerner and Daniel J. Tick

[57] ABSTRACT

An electric thru-flow heater for coffee vessels includes a carrier plate with integral clamping means depending from its underside, serving to positively position and fix a water tube — tubular heating body combination. A sheet member on top of and coincidental with the carrier plate cooperates therewith to receive and warm a coffee vessel deposited thereon. Temperature limiting means connected to the carrier plate control the energy input levels to the tubular body.

3 Claims, 3 Drawing Figures

TEMPERATURE LIMITER

ELECTRIC THRU-FLOW HEATER FOR USE WITH COFFEE MACHINES AND THE LIKE

Our invention relates to an electric thru-flow heater especially of the type used for coffee machines and the like. The thru-flow heater has a water tube arranged beneath a carrier plate and an electric tubular heating body is arranged along the water tube.

In the known embodiments of this type of thru-flow heater, the carrier plate is configured as a warm holding plate and is in the form of a die casting. The plate has grooves on its lower side for receiving the water tube and the tubular heating body. After these members are set in place the grooves are peened over. It has been shown however, that with such thru-flow heaters, the heating contact between the tubular heating body and the water tube on the one hand, and the heating contact to the carrier plate on the other hand, deteriorate with increasing use because of thermal changes. As a consequence of this condition, the temperature limiter arranged with respect to the thru-flow heater responds too late because of the disrupted thermal relationships, so that overheating can occur which, in turn, can cause destruction of the heater.

Accordingly, it is an object of our invention to provide an electric heater having a definitive thermal contact relationship. Subsidiary to this object it is an object of our invention to provide an electric thru-flow heater having an extended operational life.

According to a feature of our invention the water tube and the tubular heating body are tightly clamped by stamped out lugs to the carrier plate and are joined to each other and to the carrier plate by brazing.

With the foregoing and other objects in view, there is provided in accordance with the invention, an electric thru-flow heater for coffee vessels or the like, in combination, a carrier plate of good thermal conductivity having an upper member coincidental with and disposed on said carrier plate for receiving and warming coffee vessels placed thereon; a tubular assembly in cooperative working relationship with said carrier plate, including a water tube brazed to a tubular heating body and to the underside of said carrier plate; clamping means eminating from and integral with said carrier plate, adapted to positively fit said tubular assembly with respect to said carrier plate; and temperature limiting means connected to said carrier plate, adapted to control energy input levels to said tubular heating body.

The invention will now be described with reference to the drawings wherein.

Figure 1:
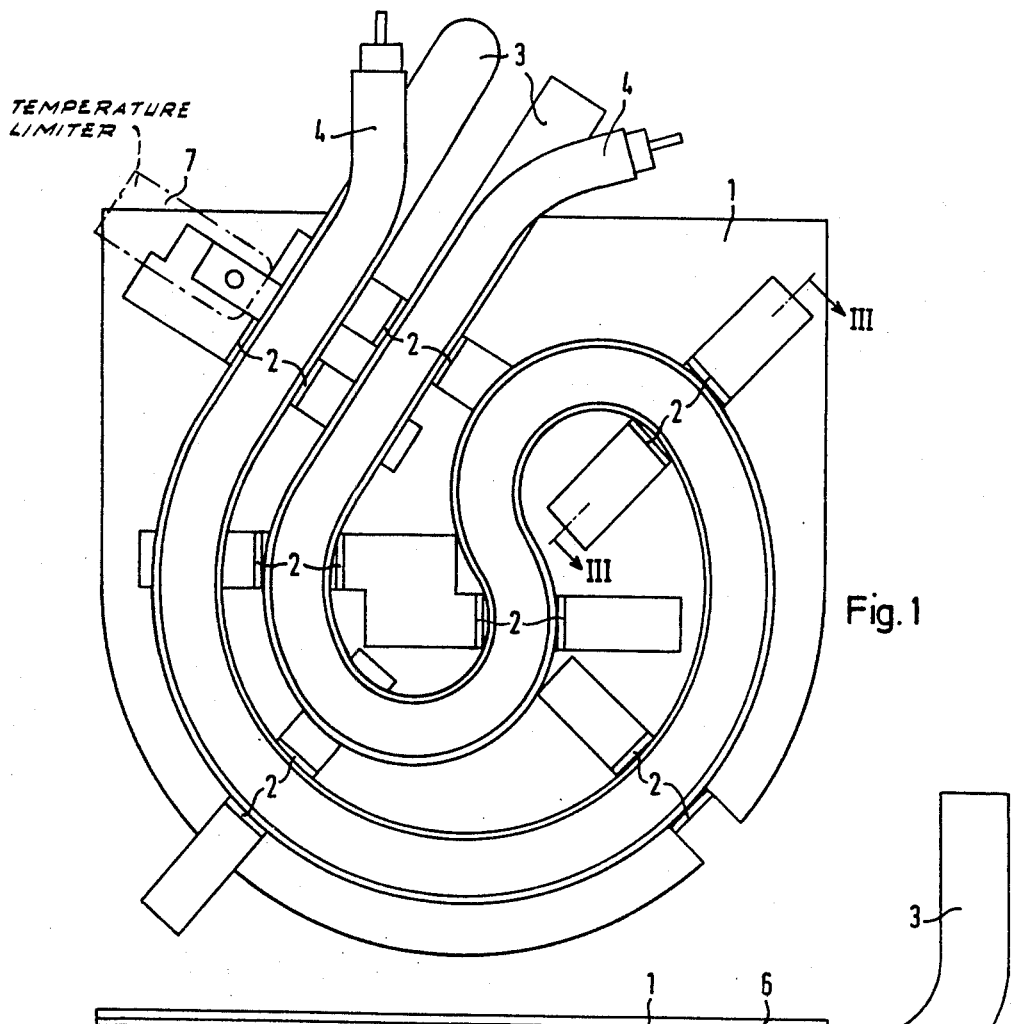
FIG. 1 is a bottom view of the thru-flow heater according to the invention.
Figure 2:
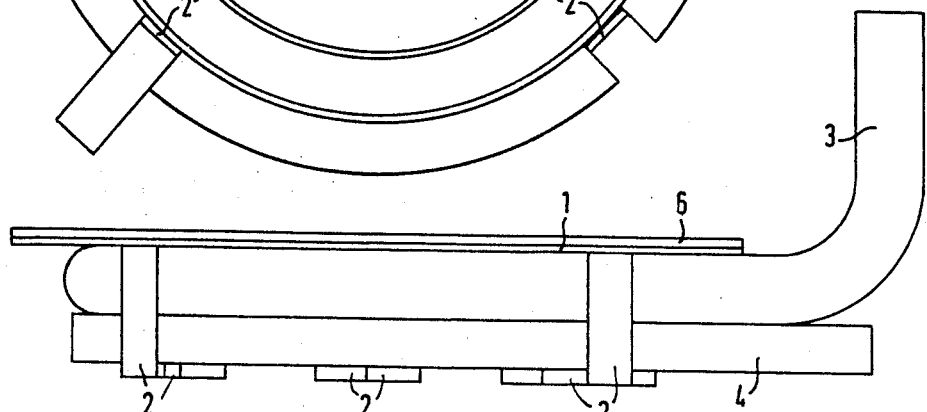
FIG. 2 is a side view of the thru-flow heater of FIG. 1.
Figure 3:
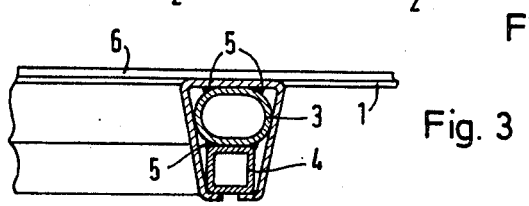
FIG. 3 is the section of the thru-flow heater taken along the line III—III of FIG. 1.

The thru-flow heater illustrated in FIGS. 1 to 3 includes a carrier plate 1 made of copper sheet metal from which lugs 2 are stamped out in pairs. At the lower side of the carrier plate 1 there is a coiled water tube 3 arranged in a plane and along the latter on the side thereof away from the carrier plate 1 is directed a tubular heating body 4. The water tube 3 and the tubular heating body 4 are held tight in a clamp-like manner by the lug pairs 2 stamped from the carrier plate 1. In addition, the water tube 3 is joined to the carrier plate 1 and to the tubular heating body 4 by means of brazing 5. At the top side of the carrier plate 1 there is a sheet 6 made, for example, from stainless steel sheet metal which serves as the receiving surface for a vessel such as a coffee pot. A temperature limiter 7 is coupled to the carrier plate 1 for monitoring the permitted boundary temperature and serves to disconnect the energy supplied to the tubular heating body 4 when the preselected boundary temperature is exceeded.

While the invention has been described by means of specific examples and in a specific embodiment, we do not wish to be limited thereto, for obvious modifications will occur to those skilled in the art without departing from the spirit and scope of the invention.

We claim:

1. In an electric thru-flow heater for coffee vessels or the like, in combination, a carrier plate of good thermal conductivity having an upper member coincidental with and disposed on said carrier plate for receiving and warming coffee vessels placed thereon; a tubular assembly in cooperative working relationship with said carrier plate, including a water tube brazed to a tubular heating body and to the underside of said carrier plate; clamping means eminating from and integral with said carrier plate, adapted to positively fit said tubular assembly with respect to said carrier plate; and temperature limiting means connected to said carrier plate, adapted to control energy input levels to said tubular heating body.

2. An electric thru-flow heater according to claim 1, wherein said upper member comprises a sheet covering the top side of said carrier plate.

3. In an electric heater according to claim 2, said sheet being made of metal.

* * * * *